United States Patent
Wei et al.

(10) Patent No.: US 9,787,213 B2
(45) Date of Patent: *Oct. 10, 2017

(54) POWER CELL BYPASS METHOD AND APPARATUS FOR MULTILEVEL INVERTER

(71) Applicant: Rockwell Automation Technologies, Inc., Mayfield Heights, OH (US)

(72) Inventors: Lixiang Wei, Mequon, WI (US); Yuan Xiao, Kitchener (CA); Haihui Lu, Shanghai (CN); Douglas B. Weber, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/978,571

(22) Filed: Dec. 22, 2015

(65) Prior Publication Data

US 2016/0111967 A1    Apr. 21, 2016

Related U.S. Application Data

(63) Continuation of application No. 13/845,416, filed on Mar. 18, 2013, now Pat. No. 9,240,731.

(51) Int. Cl.
*H02M 5/458* (2006.01)
*H02M 7/49* (2007.01)
*H02M 1/32* (2007.01)

(52) U.S. Cl.
CPC ........... *H02M 5/458* (2013.01); *H02M 7/49* (2013.01); *H02M 2001/325* (2013.01)

(58) Field of Classification Search
CPC ... H02M 5/458; H02M 7/49; H02M 2001/325
USPC .......................................................... 363/43
See application file for complete search history.

(56) References Cited

U.S. PATENT DOCUMENTS

| | | |
|---|---|---|
| 4,443,841 A | 4/1984 | Mikami et al. |
| 4,783,728 A | 11/1988 | Hoffman |
| 4,894,621 A | 1/1990 | Koenig et al. |
| 5,298,848 A | 3/1994 | Ueda et al. |
| 5,361,196 A | 11/1994 | Tanamachi et al. |
| 5,502,633 A | 3/1996 | Miyazaki et al. |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

Received search report from EIC 2800 STIC searcher Benjamin Martin on Dec. 15, 2016.*

(Continued)

*Primary Examiner* — Timothy J Dole
*Assistant Examiner* — Htet Z Kyaw
(74) *Attorney, Agent, or Firm* — Fay Sharpe LLP (57) ABSTRACT

Multilevel inverters, power cells and bypass methods are presented in which a power cell switching circuit is selectively disconnected from the power cell output, and a bypass which is closed to connect first and second cell output terminals to selectively bypass a power stage of a multilevel inverter, with an optional AC input switch to selectively disconnect the AC input from the power cell switching circuit during bypass.

20 Claims, 4 Drawing Sheets

(56) References Cited

U.S. PATENT DOCUMENTS

| | | |
|---|---|---|
| 5,625,545 A | 4/1997 | Hammond |
| 5,638,263 A | 6/1997 | Opal et al. |
| 5,642,275 A | 6/1997 | Peng et al. |
| 5,790,396 A | 8/1998 | Miyazaki et al. |
| 5,933,339 A | 8/1999 | Duba et al. |
| 5,986,909 A | 11/1999 | Hammond et al. |
| 6,005,788 A | 12/1999 | Lipo et al. |
| 6,031,738 A | 2/2000 | Lipo et al. |
| 6,058,031 A | 5/2000 | Lyons et al. |
| 6,075,350 A | 6/2000 | Peng |
| 6,075,717 A | 6/2000 | Kumar et al. |
| 6,166,929 A | 12/2000 | Ma et al. |
| 6,222,284 B1 | 4/2001 | Hammond et al. |
| 6,229,722 B1 | 5/2001 | Ichikawa et al. |
| 6,236,580 B1 | 5/2001 | Aiello et al. |
| 6,269,010 B1 | 7/2001 | Ma et al. |
| 6,295,215 B1 | 9/2001 | Faria et al. |
| 6,320,767 B1 | 11/2001 | Shimoura et al. |
| 6,359,416 B1 | 3/2002 | Rao et al. |
| 6,366,483 B1 | 4/2002 | Ma et al. |
| 6,411,530 B2 | 6/2002 | Hammond et al. |
| 6,469,916 B1 | 10/2002 | Kerkman et al. |
| 6,477,067 B1 | 11/2002 | Kerkman et al. |
| 6,541,933 B1 | 4/2003 | Leggate et al. |
| 6,556,461 B1 | 4/2003 | Khersonsky et al. |
| 6,617,821 B2 | 9/2003 | Kerkman et al. |
| 6,636,012 B2 | 10/2003 | Royak et al. |
| RE38,439 E | 2/2004 | Czerwinski |
| 6,697,271 B2 | 2/2004 | Corzine |
| 6,697,274 B2 | 2/2004 | Bernet et al. |
| 6,703,809 B2 | 3/2004 | Royak et al. |
| 6,720,748 B1 | 4/2004 | Seibel et al. |
| 6,795,323 B2 | 9/2004 | Tanaka et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,859,374 B2 | 2/2005 | Pollanen et al. |
| 6,982,533 B2 | 1/2006 | Seibel et al. |
| 7,034,501 B1 | 4/2006 | Thunes et al. |
| 7,057,905 B2 | 6/2006 | Macmillan |
| 7,068,526 B2 | 6/2006 | Yamanaka |
| 7,106,025 B1 | 9/2006 | Yin et al. |
| 7,164,254 B2 | 1/2007 | Kerkman et al. |
| 7,170,767 B2 | 1/2007 | Bixel |
| 7,180,270 B2 | 2/2007 | Rufer |
| 7,215,559 B2 | 5/2007 | Nondahl et al. |
| 7,274,576 B1 | 9/2007 | Zargari et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,428,158 B2 | 9/2008 | Bousfield, III et al. |
| 7,471,525 B2 | 12/2008 | Suzuki et al. |
| 7,495,410 B2 | 2/2009 | Zargari et al. |
| 7,495,938 B2 | 2/2009 | Wu et al. |
| 7,511,976 B2 | 3/2009 | Zargari et al. |
| 7,568,931 B2 | 8/2009 | Hammond |
| 7,589,984 B2 | 9/2009 | Salomaki |
| 7,649,281 B2 | 1/2010 | Lai et al. |
| 7,800,254 B2 | 9/2010 | Hammond |
| 7,830,681 B2 | 11/2010 | Abolhassani et al. |
| 7,894,224 B2 | 2/2011 | Ulrich |
| 7,978,488 B2 | 7/2011 | Tanaka et al. |
| 8,008,923 B2 | 8/2011 | Hammond |
| 8,040,101 B2 | 10/2011 | Itoh et al. |
| 8,093,764 B2 | 1/2012 | Hammond |
| 8,107,267 B2 | 1/2012 | Tallam et al. |
| 8,130,501 B2 | 3/2012 | Ledezma et al. |
| 8,138,697 B2 | 3/2012 | Palma |
| 8,144,491 B2 | 3/2012 | Bendre et al. |
| 8,159,840 B2 | 4/2012 | Yun |
| 8,279,640 B2 | 10/2012 | Abolhassani et al. |
| 8,400,793 B2 | 3/2013 | Jonsson |
| 8,441,147 B2 | 5/2013 | Hammond |
| 8,508,066 B2 | 8/2013 | Lee et al. |
| 8,619,446 B2 | 12/2013 | Liu et al. |
| 8,817,499 B2 | 8/2014 | Videt |
| 8,860,380 B2 | 10/2014 | Hasler |
| 8,929,111 B2 | 1/2015 | White |
| 9,036,379 B2 | 5/2015 | Schroeder |
| 9,240,731 B2 * | 1/2016 | Wei ............ H02M 5/458 |
| 9,300,220 B2 * | 3/2016 | Chen ........... H02M 5/458 |
| 2001/0048290 A1 | 12/2001 | Underwood et al. |
| 2007/0211501 A1 | 9/2007 | Zargari et al. |
| 2007/0297202 A1 | 12/2007 | Zargari et al. |
| 2008/0079314 A1 | 4/2008 | Hammond |
| 2008/0174182 A1 | 7/2008 | Hammond |
| 2008/0180055 A1 | 7/2008 | Zargari et al. |
| 2009/0073622 A1 | 3/2009 | Hammond |
| 2009/0085510 A1 | 4/2009 | Pande et al. |
| 2009/0128083 A1 | 5/2009 | Zargari |
| 2009/0184681 A1 | 7/2009 | Kuno |
| 2010/0025995 A1 | 2/2010 | Lang et al. |
| 2010/0078998 A1 | 4/2010 | Wei et al. |
| 2010/0080028 A1 | 4/2010 | Cheng et al. |
| 2010/0085789 A1 | 4/2010 | Ulrich et al. |
| 2010/0091534 A1 | 4/2010 | Tadano |
| 2010/0109585 A1 | 5/2010 | Iwahori et al. |
| 2010/0141041 A1 | 6/2010 | Bose et al. |
| 2010/0301975 A1 | 12/2010 | Hammond |
| 2011/0019449 A1 | 1/2011 | Katoh et al. |
| 2011/0095603 A1 | 4/2011 | Lee et al. |
| 2011/0249479 A1 | 10/2011 | Capitaneanu et al. |
| 2012/0057380 A1 | 3/2012 | Abe |
| 2012/0057384 A1 | 3/2012 | Jones |
| 2012/0113698 A1 | 5/2012 | Inoue |
| 2012/0195079 A1 | 8/2012 | Kroeze et al. |
| 2012/0201056 A1 | 8/2012 | Wei |
| 2012/0212982 A1 | 8/2012 | Wei et al. |
| 2012/0218795 A1 | 8/2012 | Mihalache |
| 2013/0121041 A1 | 5/2013 | Schroeder et al. |
| 2013/0121042 A1 | 5/2013 | Gan et al. |
| 2013/0223651 A1 | 8/2013 | Hoyerby |
| 2013/0272045 A1 | 10/2013 | Soeiro |
| 2014/0003099 A1 | 1/2014 | Dillig et al. |
| 2014/0036557 A1 | 2/2014 | Liu et al. |
| 2014/0042817 A1 | 2/2014 | Zargari et al. |
| 2014/0063870 A1 | 3/2014 | Bousfield, III |
| 2014/0146586 A1 | 5/2014 | Das et al. |
| 2014/0204632 A1 | 7/2014 | Noetzold et al. |
| 2014/0268928 A1 | 9/2014 | Wei et al. |
| 2014/0376287 A1 | 12/2014 | Wu et al. |
| 2015/0280608 A1 | 10/2015 | Yoscovich et al. |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 1400731 A | 3/2005 |
| CN | 2737060 | 10/2005 |
| CN | 1925289 | 3/2007 |
| CN | 101795057 A | 8/2010 |
| CN | 101855695 A | 10/2010 |
| CN | 102005960 A | 4/2011 |
| CN | 102522913 A | 6/2012 |
| CN | 102624025 A | 8/2012 |
| CN | 102739030 A | 10/2012 |
| CN | 102983568 A | 3/2013 |
| CN | 103051167 A | 4/2013 |
| CN | 103051236 A | 4/2013 |
| CN | 103078539 A | 5/2013 |
| EP | 0874448 | 10/1998 |
| EP | 1713168 A3 | 10/2006 |
| EP | 2698912 A2 | 2/2014 |
| EP | 2838189 A2 | 2/2015 |
| GB | 1295261 A | 11/1972 |
| GB | 2345594 A | 7/2000 |
| KR | 20080061641 A | 7/2008 |
| TW | 439350 | 6/2001 |
| WO | WO2012105737 A1 | 8/2012 |

(56) References Cited

FOREIGN PATENT DOCUMENTS

WO     WO2013091675 A1     6/2013
WO     WO 2013/104418 A1     7/2013

OTHER PUBLICATIONS

Peng, "A Generalized Multilevel Inverter Topology with Self Voltage Balancing", IEEE Transactions on Industry Applications, vol. 37, No. 2, Mar./Apr. 2001, pp. 611-618.
English Translation of Chinese Office Action and Search Report, CN Appl. No. 201410100302.6; issued Sep. 9, 2016; (search dated Aug. 29, 2016); 6 pgs.
Akagi et al., "A Passive EMI Filter for Eliminating Both Bearing Current and Ground Leakage Current From an Inverter-Driven Motor", IEEE Transactions on Power Electronics, 2006 , pp. 1459-1469.
Akagi et al., "An Approach to Eliminating High-Frequency Shaft Voltage and Ground Leakage Current From an Inverter-Driven Motor", IEEE Transactions on Industry Applications, 2004 , pp. 1162-1169.
Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.
Angulo, Mauricio, et al., "Level-shifted PMW for Cascaded Multilevel Inverters with Even Power Distribution", IEEE Power Electronics Specialists Conference (PESC), pp. 2373-2378, Jun. 2007.
Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.
Barbosa et al., "Active neutral-point-clamped multilevel converters," in Proc. IEEE 36th Power Electron. Spec. Conf., Jun. 16, 2005, pp. 2296-2301.
Bruckner et al., "The active NPC converter and its loss-balancing control," IEEE Trans. Ind. Electron., vol. 52, No. 3, pp. 855-868, Jun. 2005.
Cacciato et al., "Modified space-vector-modulation technique for common mode currents reduction and full utilization of the DC bus", in Proc. IEEE APEC Conf. Rec., 2009, pp. 109-115.
Cacciato et al., "Reduction of common mode currents in PWM inverter motor drives", IEEE Trans. Ind. Appl., vol. 35, No. 2, pp. 469â€ 476, Mar./Apr. 1999.
Cavalcanti et al., "Modulation Techniques to Eliminate Leakage Currents in Transformerless Three-Phase Photovoltaic Systems", IEEE Transactions on Industrial Electronics, 2010 , pp. 1360-1368.
Cengelci E., et al., A New Medium Voltage PWM Inverter Topology for Adjustable Speed Drives, IEEE, 0-7803-4943-1, 1998, pp. 1416-1423.
Cha, Han Ju et al. An Approach to Reduce Common-Mode Voltage in Matrix Converter, Jul./Aug. 2003, IEEE, vol. 39, pp. 1151-1159.
Cha, Han Ju, "Analysis and Design of Matrix Converter for Adjustable Speed Drive and Distributed Power Sources", Aug. 2004, Texas A&M Univ., Doctor of Philosophy Dissertation Paper.
Chaudhuri, Toufann, et al., Introducing the Common Cross Connected Stage ($C^3S$) for the 5L ANPC Multilevel Inverter, IEEE, 978-1-4244-1668-4, 2008, pp. 167-173.
Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.
De Broe, et al., "Neutral-to-Ground Voltage Minimization in a PWM-Rectifier/Inverter Configuration", Power Electronics and Variable Speed Drives, Sep. 23-25, 1996, Conference Publication No. 429, IEEE, 1996.
Erdman, Russel J. Kerkman, David W. Schlegel, and Gary L. Skibinski, "Effect of PWM Inverters on AC Motor Bearing Currents and Shaft Voltages", 1996 IEEE.
Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.
Floricau, Dan et al., A new stacked NPC converter: 3L-topology and control, Proceedings of the $12^{th}$ European Conf. on Power Electronics and Applications, EPE 2007, EPE Association, 2007, 10 pgs.
Glinka, M., Prototype of Multiphase Modular-Multilevel-Converter with 2 MW power rating and 17-level-output—voltage, IEEE, 0-7803-8399-0, 2004, pp. 2572-2576.
Guennegues et al., "Selective harmonic elimination PWM applied to H-bridge topology in high speed applications," in Proc. Int. Conf. Powereng, Mar. 18-20, 2009, pp. 152-156.
Guennegues, V., et al., A Converter Topology for High Speed Motor Drive Applications, IEEE Xplore, 2009, 8 pgs.
Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.
Hava et al., "A high-performance PWM algorithm for common-mode voltage reduction in three-phase voltage source inverters," IEEE Trans. Power Electron., vol. 26, No. 7, pp. 1998-2008, Jul. 2011.
Hiller, Mark et al., Medium-Voltage Drives; An overview of the common converter topologies and power semiconductor devices, IEEE Industry Applications Magazine, Mar.-Apr. 2010, pp. 22-30.
Horvath, "How isolation transformers in MV drives protect motor insulation", TM GE Automation Systems, Roanoke, VA, 2004.
Hua, Lin, "A Modulation Strategy to Reduce Common-Mode Voltage for Current-Controlled Matrix Converters", Nov. 2006, IEEE Xplore, pp. 2775-2780.
Iman-Eini, Hossein et al., "A Fault-Tolerant Control Strategy for Cascaded H-Bridge Multilevel Rectifiers", Journal of Power Electronics, vol. 1, Jan. 2010.
Kerkman, et al., "PWM Inverters and Their Influence on Motor Over-Voltage," 1997 IEEE.
Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.
Kieferndorf et al., "A new medium voltage drive system based on anpc-51 technology," in Proc. IEEE-ICIT, Viñ del Mar, Chile, Mar. 2010,pp. 605-611.
Kouro et al., "Recent advances and industrial applications of multilevel converters," IEEE Trans. Ind. Electron., vol. 57, No. 8, pp. 2553-2580, Aug. 2010.
Lai et al., "Optimal common-mode voltage reduction PWM technique for inverter control with consideration of the dead-time effects—part I: basic development," IEEE Trans. Ind. Appl., vol. 40, No. 6, pp. 1605-1612, Nov./Dec. 2004.
Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.
Lesnicar et al., "An Innovative Modular Multilevel Converter Topology Suitable for a Wide Power Range", 2003 IEEE Bologna PowerTech Conference, Jun. 23-26, Bologna Italy, 6 pgs.
Lesnicar, A., et al., A new modular voltage source inverter topology, Inst. of Power Electronics and Control, Muenchen, DE, Oct. 10, 2007, pp. 1-10.
Lezana, Pablo et al., "Survey on Fault Operation on Multilevel Inverters", IEEE Transactions on Industrial Electronics, vol. 57, No. 7, Jul. 2010, pp. 2207-2217.
Li, Jun, et al., A New Nine-Level Active NPC (ANPC) Converter for Grid Connection of Large Wind Turboines for Distributed Generation, IEEE Transactions on Power Electronics, vol. 26, No. 3, Mar. 2011, pp. 961-972.
McGrath, Brendan Peter et al., "Multicarrier PMW Strategies for Multilevel Inverters," IEEE Transactions on Industrial Electronics, vol. 49, No. 4, pp. 858-867, Aug. 2002.
Meili et al., "Optimized pulse patterns for the 5-level ANPC converter for high speed high power applications," in Proc. 32nd IEEE IECON, Nov. 6-10, 2006, pp. 2587-2592.

(56) References Cited

OTHER PUBLICATIONS

Muetze & A. Binder, "Don't lose Your Bearings, Mitigation techniques for bearing currents in inverter-supplied drive systems", 2006 IEEE.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

O-Harvest, product information, Beijing Leader & Harvest Electric Technologies Co., Ltd., http:/www.1d-harvest.com/en/3-1-2.htm, retrieved from the Internet Apr. 11, 2013, 3 pgs.

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Robicon, "Perfect Harmony MV Drive Product Overview", 18 pgs.. obtained from the World Wide Web Apr. 2013.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Rodriguez et al., "Multilevel inverters: A survey of topologies, controls, and applications," IEEE Trans. Ind. Electron., vol. 49, No. 4, pp. 724-738, Aug. 2002.

Rodriguez et al., "Operation of a Medium-Voltage Drive Under Faulty Conditions", IEEE Transactions on Industrial Electronics, vol. 52, No. 4, Aug. 2005, pp. 1080-1085.

Rodriguez et al., "Multilevel voltage source—converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Saeedifard, Maryann et al., Analysis and Control of DC-Capacitor-Voltage-Drift Phenomenon of a Passive Front-End Five-Level Converter, IEEE Transactions on Industrial Electronics, vol. 54, No. 6, Dec. 2007, pp. 3255-3266.

Sedghi, S. et al., "A New Multilevel Carrier Based Pulse Width Modulation Method for Modular Multilevel Inverter", IEEE, 8$^{th}$ International Conference on Power Electronics—ECCE Asia (ICPE & ECCE), pp. 1432-1439, May 30-Jun. 3, 2011.

Sepahvand, Hossein et al., "Fault Recovery Strategy for Hybrid Cascaded H-Bridge Multi-Level Inverters", 2011 IEEE, pp. 1629-1633.

Serpa et al., "Fivelevel virtual-flux direct power control for the active neutral-point clamped multilevel inverter," in Proc. IEEE Power Electron. Spec. Conf.

Silva, Cesar et al., Control of an Hybrid Multilevel Inverter for Current Waveform Improvement, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., Floating Capacitor Voltage Regulation in Diode Clamped Hybrid Multilevel Converters, IEEE, 978-1-4244-3439-8, 2009, pp. 197-202.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., Synthesis of Multilevel Converters Based on Single-and/or Three-Phase Converter Building Blocks, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012 , pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Suppression in Neutral-Connected Power Converter Systems. IEEE Transactions on Power Electronics, 2012 , pp. 1228-1236.

\* cited by examiner

POWER CELL BYPASS METHOD AND APPARATUS FOR MULTILEVEL INVERTER

REFERENCE TO RELATED APPLICATION

This application is a continuation of U.S. patent application Ser. No. 13/845,416, filed Mar. 18, 2013, entitled IMPROVED POWER CELL BYPASS METHOD AND APPARATUS FOR MULTILEVEL INVERTER, the entirety of which application is hereby incorporated by reference.

BACKGROUND

Multilevel inverters are sometimes employed in motor drives and other power conversion applications to generate and provide high voltage drive signals to a motor or other load in high power applications. One form of multilevel inverter is a Cascaded H-Bridge (CHB) inverter architecture, which employs multiple series-connected power stages such as H-Bridge inverters for driving each motor winding phase. Each H-Bridge is powered by a separate DC source and is driven by switch signals to generate positive or negative output voltage, with the series combination of multiple H-Bridge stages providing multilevel inverter output capability for driving a load. Device degradation within a particular power stage, however, may inhibit the ability to provide a desired output voltage to a load, particularly since the stages are connected in series with one another. Accordingly, it is desirable to provide the ability to bypass a particular degraded power stage, for example, to continue operation of a multilevel inverter at reduced output capacity and/or to bypass one or more healthy power stages to balance a power converter output to accommodate one or more degraded power stages that have also been bypassed.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides bypass apparatus and techniques for CHB and other power stages or power cells of a multilevel power converter, in which the H-Bridge or other switching circuit is electrically disconnected from the power stage output, and a bypass switch is closed across first and second output terminals in order to bypass the stage. Unlike conventional approaches that simply utilize a bypass switch across the output terminals, the novel technique of the present disclosure advantageously avoids or mitigates allowing a motor or other output load to remain electrically connected with a failed cell.

A power conversion system is provided, which includes multiple series-connected power stages, individually including a switching circuit, a pair of output control switches coupled between the switching circuit and the power stage output, as well as a bypass switch connected across the output. The controller selectively bypasses at least one of the power stages by opening the corresponding output control switches, and closing the bypass switch. In certain embodiments, the output control switches are opened before closing the bypass switch. Certain embodiments, moreover, further provide an input switch coupled between an AC input and the switching circuit of the power stage, where the controller bypasses the power stage by opening the output control switches, closing the bypass switch, and opening the input switch.

A power cell is provided in accordance with further aspects of the disclosure, which may be used as a power stage in a multilevel inverter circuit. The power cell includes an AC input, a rectifier, a DC link circuit, and a switching circuit with two or more switching devices coupled between the DC link circuit and an output. First and second output control switches are connected between corresponding switching circuit nodes and output terminals, and a bypass switch is coupled across the output. Certain embodiments further include an input switch coupled between the AC input and the switching circuit.

Methods are disclosed for bypassing a power stage of a multilevel inverter circuit, including electrically disconnecting a switching circuit of the power stage from an output of the power stage, and electrically connecting two output terminals of the power stage to one another to bypass the power stage. In certain embodiments, the method further includes electrically disconnecting the switching circuit from an input.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Figure 1:
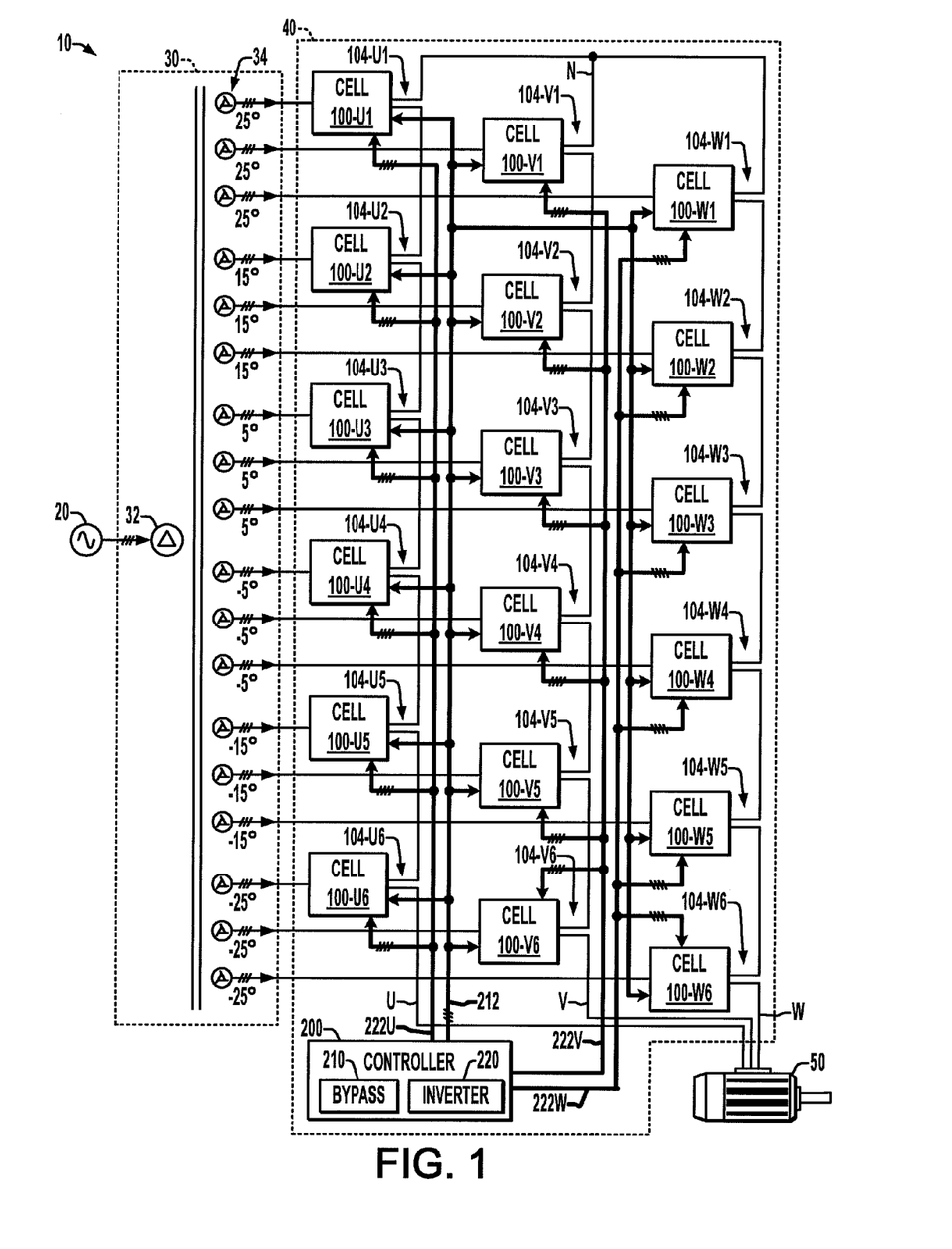
FIG. 1 is a schematic diagram illustrating a three-phase 13-level CHB inverter-based motor drive power conversion system with a controller providing switching and bypass control signals to the individual power cells.

FIG. 1 illustrates an exemplary multilevel inverter motor drive power conversion system 10 which includes a three-phase multilevel inverter 40 with series-connected power stages 100-1, 100-2, 100-3, 100-4, 100-5, 100-6 for each of three sections associated with the motor phases U, V and W of a motor load 50. Other embodiments are possible in which other forms of load 50 are driven, wherein the present disclosure is not limited to motor drive type power converters. In certain embodiments, the individual power stages 100 include an H-bridge switching circuit or inverter 140 with switching devices (e.g., Q1-Q4 in FIG. 2 below), although any suitable form of switching circuit 140 may be provided in the individual power stages 100 with two or more switches forming a switching circuit for generating a power stage output having one of two or more possible levels according to switching control signals 222 provided by an inverter control component 220 of a power converter controller 200.

The example of FIG. 1 is a multiphase 13-level inverter 40 with six power stages 100 for each of three motor load phases U, V and W (e.g., 100-U1, 100-U2, 100-U3, 100-U4, 100-U5 and 100-U6 for phase U; 100-V1, 100-V2, 100-V3, 100-V4, 100-V5 and 100-V6 for phase V; and stages 100-W1, 100-W2, 100-W3, 100-W4, 100-W5, 100-W6 for phase W). The various aspects of the present disclosure may be implemented in association with single phase or multiphase multilevel inverter type power conversion systems having any integer number "N" power stages 100, where N is greater than one. In addition, although the illustrated embodiments utilize H-Bridge stages 100 cascaded to form multilevel inverters 40 for each phase of the motor drive system 10, other types and forms of power stages 100 can be used, such as a stage 100 with a switching circuit having more or less than four switching devices, wherein the broader aspects of the present disclosure are not limited to H-Bridge power cells shown in the illustrated embodiments. For instance, embodiments are possible, in which the individual cells may include as few as two switching devices or any integer number of switches greater than or equal to two.

As best seen in FIG. 1, the power converter 10 is supplied with multiphase AC input power from a phase shift transformer 30 having a multiphase primary 32 (a delta configuration in the illustrated embodiment) receiving three-phase power from an AC power source 20. The transformer 30 includes 18 three-phase secondaries 34, with six sets of three delta-configured three-phase secondaries 34, with each set being at a different phase relationship. Although the primary 32 and the secondaries 34 are configured as delta windings in the illustrated example, "Y" connected primary windings and/or secondary windings or other winding configurations can alternatively be used. In addition, while the transformer has three-phase primary and secondary windings 32, 34, other single or multiphase implementations can be used. Although the various secondaries 34 in the illustrated embodiments are phase shifted, non-phase shifted embodiments are possible.

Each three-phase secondary 34 in the example of FIG. 1 is coupled to provide AC power to drive a three-phase rectifier 120 of a corresponding power stage 100 of the three-phase multilevel inverter 40. The inverter 40 is a 13-level inverter with six cascaded H-Bridge power stages 100U-1 through 100U-6 having outputs 104U-1 through 104U-6 connected in series with one another (cascaded) between a motor drive neutral point N and a first winding U of a three-phase motor load 50. Similarly, six power stages 100V-1 through 100V-6 provide series connected voltage outputs 104V-1 through 104V-6 between the neutral N and the second winding V, and power stages 100W-1 through 100W-6 provide series connected voltage outputs 104W-1 through 104W-6 between the neutral N and the third winding W of the motor 50. The controller 200 provides control signals 222U to the power stages 100U-1 through 100U-6 associated with the first motor winding U, and also provides control signals 222V to the power stages 100V-1 through 100V-6 and control signals 222W to the power stages 100W-1 through 100W-6. Although the inverter 40 shown in FIG. 1 is a multiphase unit supplying output power to phases U, V and W to drive a three-phase motor 50, the concepts of the present disclosure are also applicable to single phase converters, for example, a three-phase-to-single phase matrix converter receiving a three phase input from the source 20, with a single series-connected group of cells 100 providing power to a single phase motor or other single phase output load. Moreover, other multiphase outputs can be provided having more than three phases.

Figure 2:
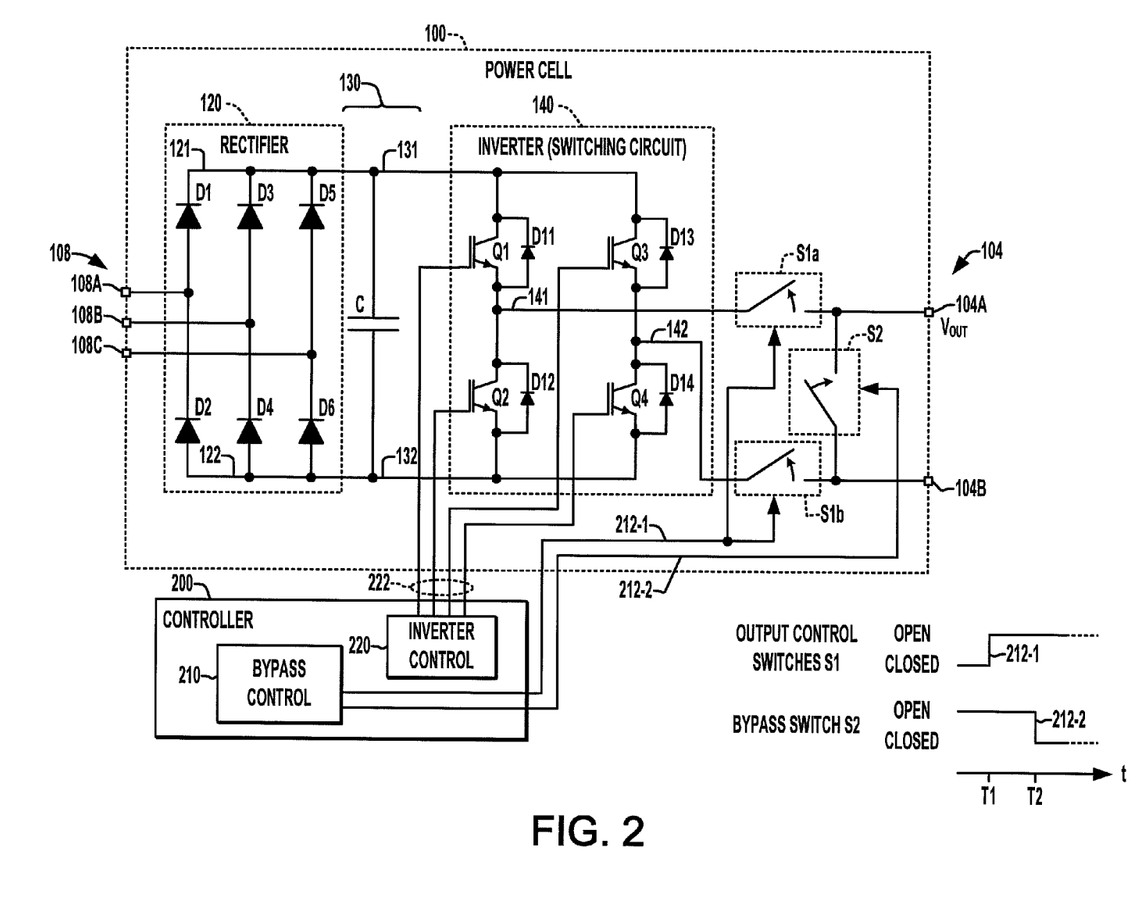
FIG. 2 is a schematic diagram illustrating an H-Bridge power cell or power stage in the power converter of FIG. 1 with a three-phase rectifier, a DC link circuit, an inverter, output control switches coupled between the inverter and the load, and a bypass switch for bypassing the power cell.

Referring also to FIG. 2, power cells 100 are provided for use as the power stages of single or multi-phase multilevel inverters 40, with bypass switching devices actuated by a bypass component 210 of the controller 200. The controller 200 and its components 210, 220 can be implemented using any suitable hardware, processor executed software or firmware, or combinations thereof, wherein an exemplary embodiment of the controller 200 includes one or more processing elements such as microprocessors, microcontrollers, DSPs, programmable logic, etc., along with electronic memory, program memory and signal conditioning driver circuitry, with the processing element(s) programmed or otherwise configured to generate signals 222 suitable for operating the switching devices of the power stages 100. In addition, the illustrated controller 200 in certain embodiments implements the bypass control component 210 to generate bypass control signals 212 for selective bypassing of one or more of the power stages 100.

Figure 4:
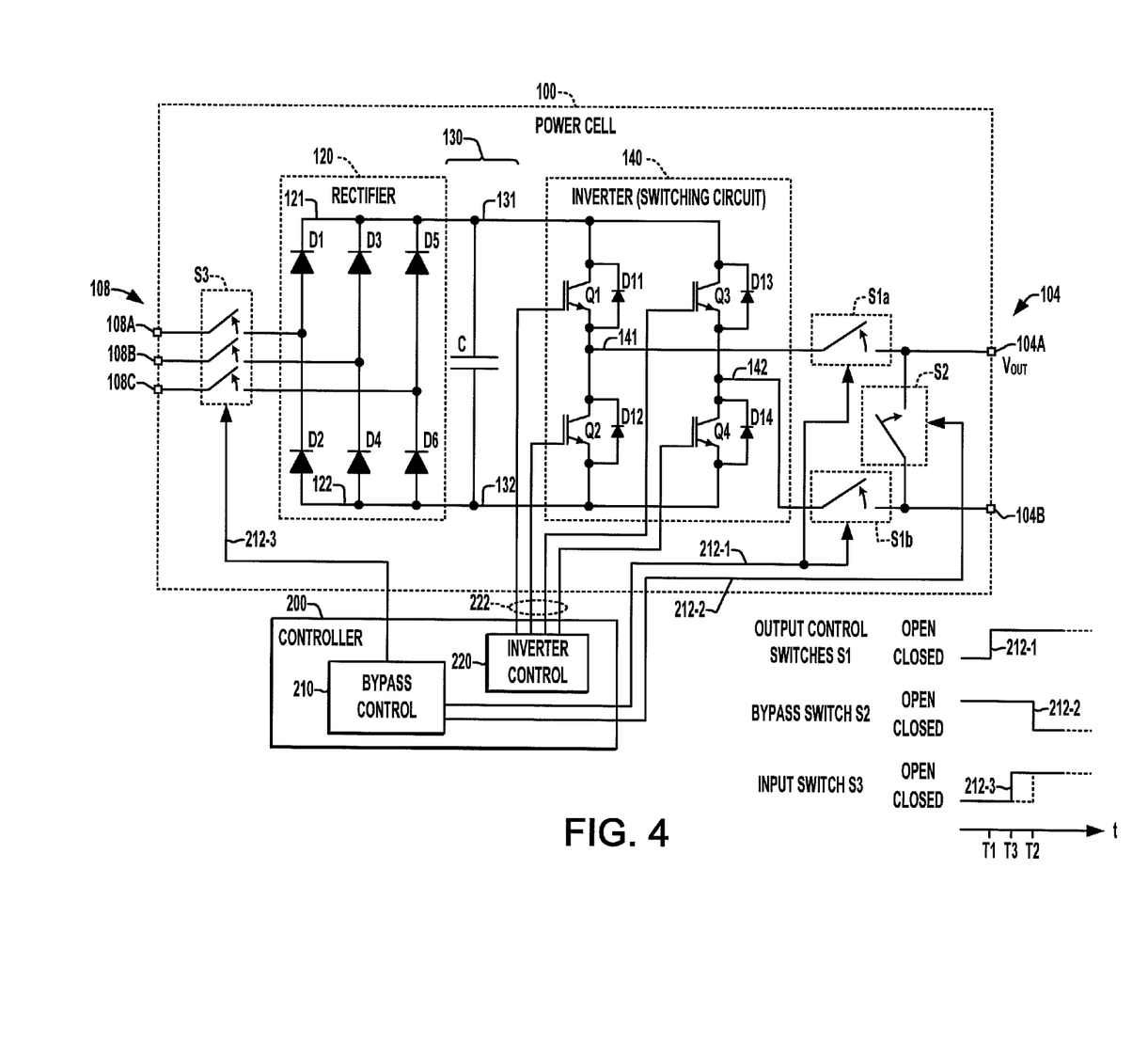
FIG. 4 is a schematic diagram illustrating another H-Bridge power cell embodiment with output control switches, a bypass switch, and a multi-phase input switch for bypassing the power cell.

In certain implementations, the bypass control component 210 provides individual signals or values 212 to the individual power cells 100 for direct control over output control switches S1a and S1b (signal(s) 212-1), a bypass switch S2 (signal 212-2) and optionally generates input switching control signal(s) 212-3 for operating an optional input switch S3 (FIG. 4 below). In other possible implementations, local switching driver circuitry and/or switching logic can be provided within the power stages 100 to implement the bypass switching operation as described herein based on one or more initiating actions from the bypass control component 210 or from any other controlling element of, or associated with, the power conversion system 10. For instance, a single signal or value can be provided to an individual power cell 100, and a local logic and/or switching control circuit on the cell 100 can initiate the described bypass switching operation in response to receipt of such a signal or value.

FIG. 2 illustrates one possible implementation of an H-Bridge power stage 100. The power stage in FIG. 2 is implemented as a power cell 100 including an AC input 108 with input terminals 108A, 108B and 108C connectable to receive AC input power, in this case three-phase power from an AC source such as a secondary winding 34 of the transformer 30 in FIG. 1. The AC input power is provided from the cell input 108 to a rectifier circuit 120 having onboard rectifier diodes D1-D6 forming a three-phase rectifier 120 which receives three-phase AC power from the corresponding transformer secondary 34. In this example, a passive rectifier 120 is used, but active rectifier circuits or other forms of rectifiers can be used, whether having a single or multi-phase input. The power cell 100 also includes a DC link circuit 130 and a switching circuit (e.g., H-Bridge inverter 140) providing an output voltage $V_{OUT}$ to a power cell output 104 having first and second output terminals 104A and 104B.

In the illustrated embodiment, the rectifier 120 provides DC power across a DC capacitor C connected between DC link terminals 131 and 132 of the DC link circuit 130. The DC link circuit 130, in turn, provides an input to an H-Bridge inverter 140 formed by four switching devices Q1-Q4 configured in an "H" bridge circuit. Although the illustrated power stage 100 operates based on DC power provided by an internal rectifier circuitry 120 driven by an AC input from the corresponding transformer secondary 34, any suitable form of a DC input can be provided to the power stages 100 in accordance with the present disclosure, and the power stages 100 may, but need not, include onboard rectification circuitry 120. In addition, any suitable switching circuit configuration can be used in the switching circuits 140 (e.g., inverter) of individual stages 100 having at least two switching devices Q configured to selectively provide voltage at the stage output 104 of at least two distinct levels. Moreover, any suitable type of switching devices Q may be used in the power stages 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc.

The illustrated four-switch H-Bridge implementation (FIG. 2) advantageously allows selective switching control signal generation by the controller 200 to provide at least two distinct voltage levels at the output 104 in a controlled fashion. For instance, a voltage is provided at the output terminals 104A and 104B of a positive DC level substantially equal to the DC bus voltage across the DC link capacitor C (e.g., +VDC) when the switching devices Q1 and Q4 are turned on (conductive) while the other devices Q2 and Q3 are off (nonconductive). Conversely, a negative output is provided when Q2 and Q3 are turned on while Q1 and Q4 are off (e.g., −VDC). Accordingly, the exemplary H-Bridge power stage 100 advantageously allows selection of two different output voltages, and the cascaded configuration of six such stages (e.g., FIG. 1) allows selective switching control signal generation by the inverter control component 220 to implement 13 different voltage levels for application to the corresponding motor phase U, V or W. It is noted that other possible switching circuitry may be used to implement a two, three, or K-level selectable output for individual stages 100, where K is any positive integer greater than 1. Any suitable logic or circuitry in the controller 200 can be used for providing inverter switching control signals 222 to a given power stage 100, where the controller 200 may also include signal level amplification and/or driver circuitry (not shown) to provide suitable drive voltage and/or current levels sufficient to selectively actuate the switching devices Q1-Q4, for instance, such as comparators, carrier wave generators or digital logic and signal drivers.

For bypassing operation, the power cell 100 in FIG. 2 includes a pair of output control switches S1a and S1b coupled between the switching circuit 140 and the output 104. In particular, the first output control switch S1a is coupled between a first switching circuit node 141 and a first output terminal 104A, and the second output control switch S1b is coupled between a second switching circuit node 142 and the second output terminal 104B. The output control switches S1 are individually operative in a first state to allow current flow between the switching circuit 140 and the output 104, and in a second state to prevent current from flowing between the switching circuit 140 and the output 104 according to one or more output switching control signals 212-1 from the bypass control component 210. Although a single output control switching signal 212-1 is shown in the example of FIG. 2, separate output control signals 212-1 can be used for the individual switches S1A and S1B in other implementations, which may, but need not be switched at the same time. The output control switches S1, moreover, can be any suitable form of single or multiple electrical or electromechanical switching devices, including without limitation semiconductor-based switches, contactors, relays, etc. In addition, the power cell 100 includes a bypass switch S2 connected across the output terminals 104 and operative according to a bypass control signal 212-2 from the controller 210. The bypass switch S2 is operative in a nonconductive state by which the cell output voltage $T_{OUT}$ is controlled by operation of the switching circuit 140, and a conductive state (e.g., closed or conductive) to bypass the output 104 of the switching circuit 140. The bypass switch 102 can be any suitable form of single or multiple electrical or electromechanical switching device.

In operation of the converter 10, the bypass controller 210 selectively bypasses the cell 100 by placing the first and second output control switches S1a, S1b in the respective second states via signal(s) 212-1 and by placing the bypass switch S2 in the conductive state using signal 212-2. Opening the output control switches S1 effectively disconnects and isolates the output 104 (and hence the motor load 50 (FIG. 1)) from the inverter switching circuit 140. Furthermore, closure of the bypass switch S2 effectively electrically connects the first and second output terminals 104A and 104B to one another such that other power cells 100 in the converter 10 can continue to drive the motor load 50 even when a given power cell 100 has been bypassed. As seen in the waveform diagram of FIG. 2, moreover, the controller 200 is operative in certain implementations to selectively place the output control switches S1a, S1b in the second state (open) at time T1 before closing the bypass switch S2 at time T2. In this manner, the controller 200 effectively isolates the output 104 from the switching circuit 140 before bypassing the output terminals 104A and 104B. Relative timing and sequence of the switching operations is not critical in all embodiments of the present disclosure, and can be implemented in different orders in other implementations. The difference in the switching times (e.g., T2-T1) for the illustrated embodiments and switching sequences, moreover, can be any suitable length of time controlled by the bypass component 210, for instance, based on the value of the DC link capacitance C or other considerations such as operation of potentially degraded devices within the power cell 100 and/or the need to quickly bypass the power cell 100. In certain embodiments, moreover, the controller 210 may selectively adjust the bypass switching control timing according to one or more conditions in the power converter 10.

Figure 3:
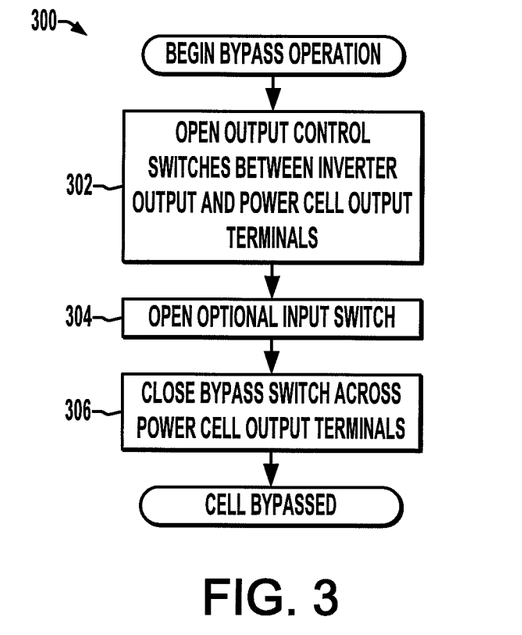
FIG. 3 is a flow diagram illustrating an exemplary method for bypassing a power cell in a multilevel inverter power conversion system.

FIG. 3 illustrates a power stage bypassing method 300 for bypassing a power stage of a multilevel inverter circuit 40, such as the power cell 100 in FIG. 2 or FIG. 4. In certain embodiments, the controller 200 includes at least one processor programmed to perform the process 300 such as by a bypass control component 210 to provide the signals 212 to select ones of the power cells 100, along with other functionality set forth herein (e.g., providing switching control signals 222 via the inverter control component 220) according to computer executable instructions from a non-transitory computer readable medium, such as a computer memory, a memory within a power converter control system (e.g., controller 200), a CD-ROM, floppy disk, flash drive, database, server, computer, etc. which has computer executable instructions for performing the processes and controller functionality described herein. While the exemplary method 300 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide the power stage bypassing concepts disclosed herein.

The bypass operation can be initiated according to any suitable input signal received by the controller 200 in certain implementations. For instance, the power conversion controller 200 may detect one or more operating conditions of the power converter 10 indicating possible degradation of one or more power stages 100, and may initiate bypassing of one or more selected cells 100 in response. In other possible implementations, the controller 200 may receive a signal or message from an external device (not shown) and initiate bypassing accordingly.

Bypassing operation begins in the process 300 by opening the output control switches (S1 in FIG. 2) between the inverter switching circuit 140 and the power cell output terminals 104A and 104B at 302 to effectively electrically disconnect and isolate the switching circuit 140 from the output 104. In certain embodiments, one or more input switches (e.g., S3 in FIG. 4 below) are opened at 304 to prevent current flow between the AC input (e.g., the secondary windings 34 in FIG. 1 above) and the rectifier circuit 120 (FIG. 2). At 306, a bypass switch (e.g., switch S2 in FIGS. 2 and 4) is closed in order to bypass the power stage output 104. As discussed above, in certain embodiments, the bypass switch S2 is closed at 306 after opening the output control switches S1 at 302. Moreover, if one or more input control switches S3 are used (FIG. 4), such can be opened at 304 in certain embodiments after the output control switches Si are opened at 302 and before the bypass switch S2 is closed at 306.

Referring also to FIG. 4, another power cell embodiment 100 is illustrated, which is configured generally as described above in connection with FIG. 2. In addition, the embodiment of FIG. 4 includes an input switch S3 coupled between an AC input 108 and the switching circuit 140 of the power stage 100. The input switch S3 in this case is a three phase (three contact) switching device, but separate switches can be used for each input phase, with two contacts or two switches being used for a single phase AC input, three contacts or three switches being used for a three phase input, etc. Furthermore, for embodiments including an on-board rectifier circuit 120 as shown in FIG. 4, the input switch S3 can be located between the input 108 and the rectifier 120. The input switch S3 is operative in a first (e.g., conductive or ON) state to allow current to flow between the AC input 108 and the switching circuit 140 and in a second (nonconductive or OFF) state to prevent current from flowing between the AC input and the switching circuit 140. In this embodiment, the controller 200 bypasses the power stage 100 by placing the first and second output control switches S1a, S1b in the respective second (nonconductive or open) states, as well as by placing the bypass switch S2 in the conductive state, and by placing the input switch S3 in the second (nonconductive) state.

The provision of the input switch S3 in this embodiment advantageously disconnects the power cell 100 and the output 104 from the AC input source, whether from the secondary 34 in FIG. 1 or from another associated AC input source. As seen in FIG. 4, moreover, the controller 200 in certain embodiments selectively places the first and second output control switches S1a, S1b in the second state before placing the input switch S3 in the second state, and may place the input switch S3 in the second state (e.g., at time T3 in FIG. 4) before placing the bypass switch S2 in the conductive state. In these embodiments, the timing between the signals 212 (e.g., T2-T1, T3-T1 and T2-T3) can be set according to any of the above described considerations and can be selectively adjusted by the controller 200 based on one or more power converter conditions. As discussed above, moreover, other switching sequences and/or relative timing may be implemented in other embodiments, wherein the broader aspects of the present disclosure are not limited by the illustrated examples.

By the above techniques and apparatus, a given cell 100 may be effectively bypassed to allow continued operation of the power conversion system 10 regardless of the failure state of the cell 100. For example, if one of the upper switches Q1 or Q3 (FIG. 2 or 4) should fail in a conductive state, the output control switches S1 will open, thereby disconnecting the output load 50 (FIG. 1) from the upper DC link node 131. Likewise, even if one of the lower switches Q2 or cute for fails in a conductive state, the output 104 is electrically isolated from the lower DC rail 132. Thus, the present disclosure advantageously presents a significant advance over conventional multilevel converter cell bypass techniques and protects the output load 50 regardless of the failure condition of a given power cell 100 while allowing the power cell 100 to be bypassed for continued operation of the converter 10.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
 a plurality of power stages connected in series to form a multilevel inverter circuit, the power stages individually comprising:
 a switching circuit including a plurality of switching devices coupled between a DC link circuit and an output, the switching circuit operative according to a plurality of switching control signals to provide an output voltage having an amplitude of one of at least two discrete levels at the output, a first output control switch coupled between a first node of the switching circuit and a first output terminal, the first output control switch operative in a first state to allow current to flow between the switching circuit and the output, and in a second state to prevent current from flowing between the switching circuit and the output, a second output control switch coupled between a second node of the switching circuit and a second output terminal, the second output control switch operative in a first state to allow current to flow between the switching circuit and the output, and in a second state to prevent current from flowing between the switching circuit and the output, and a bypass switch coupled across the output of the switching circuit, the bypass switch operative in a conductive state to bypass the output of the switching circuit; and a controller operative to selectively bypass at least one power stage by placing the first and second output control switches in the respective second states and by placing the bypass switch in the conductive state.

2. The power conversion system of claim 1, wherein the controller is operative to selectively place the first and second output control switches in the second state before placing the bypass switch in the conductive state.

3. The power conversion system of claim 2, further comprising an input switch coupled between an AC input and the switching circuit of the at least one power stage, the input switch being operative in a first state to allow current to flow between the AC input and the switching circuit and a second state to prevent current from flowing between the AC input and the switching circuit, wherein the controller is operative to bypass the at least one power stage by placing the first and second output control switches in the respective second states, by placing the bypass switch in the conductive state, and by placing the input switch in the second state.

4. The power conversion system of claim 3, wherein the controller is operative to selectively place the first and second output control switches in the second state before placing the input switch in the second state.

5. The power conversion system of claim 4, wherein the controller is operative to place the input switch in the second state before placing the bypass switch in the conductive state.

6. The power conversion system of claim 5, wherein the switching circuit includes four switching devices connected in an H-bridge configuration between the DC link circuit and the output, and wherein the controller is operative to provide the switching control signals to the four switching devices of the switching circuit to provide the output voltage having an amplitude of one of at least two discrete levels at the output.

7. The power conversion system of claim 2, wherein the switching circuit includes four switching devices connected in an H-bridge configuration between the DC link circuit and the output, and wherein the controller is operative to provide the switching control signals to the four switching devices of the switching circuit to provide the output voltage having an amplitude of one of at least two discrete levels at the output.

8. The power conversion system of claim 1, further comprising an input switch coupled between an AC input and the switching circuit of the at least one power stage, the input switch being operative in a first state to allow current to flow between the AC input and the switching circuit and a second state to prevent current from flowing between the AC input and the switching circuit, wherein the controller is operative to bypass the at least one power stage by placing the first and second output control switches in the respective second states, by placing the bypass switch in the conductive state, and by placing the input switch in the second state.

9. The power conversion system of claim 8, wherein the controller is operative to selectively place the first and second output control switches in the second state before placing the input switch in the second state.

10. The power conversion system of claim 8, wherein the switching circuit includes four switching devices connected in an H-bridge configuration between the DC link circuit and the output, and wherein the controller is operative to provide the switching control signals to the four switching devices of the switching circuit to provide the output voltage having an amplitude of one of at least two discrete levels at the output.

11. The power conversion system of claim 1, wherein the switching circuit includes four switching devices connected in an H-bridge configuration between the DC link circuit and the output, and wherein the controller is operative to provide the switching control signals to the four switching devices of the switching circuit to provide the output voltage having an amplitude of one of at least two discrete levels at the output.

12. A power cell for use as a power stage in a multilevel inverter circuit, the power cell comprising:

an AC input;

a rectifier coupled with the AC input;

a DC circuit coupled with the rectifier and including at least one capacitance;

a switching circuit including a plurality of switching devices coupled between the DC circuit and an output, the switching circuit operative according to a plurality of switching control signals to provide an output voltage having an amplitude of one of at least two discrete levels at the output;

a first output control switch coupled between a first node of the switching circuit and a first output terminal, the first output control switch operative according to at least one output switching control signal in a first state to allow current to flow between the first node of the switching circuit and the first output terminal, and in a second state to prevent current from flowing between the first node of the switching circuit and the first output terminal;

a second output control switch coupled between a second node of the switching circuit and a second output terminal, the second output control switch operative according to at least one output switching control signal in a first state to allow current to flow between the second node of the switching circuit and the second output terminal, and in a second state to prevent current from flowing between the second node of the switching circuit and the second output terminal; and a bypass switch coupled across the output of the switching circuit, the bypass switch operative according to a bypass switching control signal in a nonconductive state and in a conductive state to bypass the output of the switching circuit.

13. The power cell of claim 12, further comprising an input switch coupled between the AC input and the switching circuit, the input switch being operative according to an input switching control signal in a first state to allow current to flow between the AC input and the switching circuit and a second state to prevent current from flowing between the AC input and the switching circuit.

14. The power cell of claim 13, wherein the switching circuit includes four switching devices connected in an H-bridge configuration between the DC circuit and the output.

15. The power cell of claim 12, wherein the switching circuit includes four switching devices connected in an H-bridge configuration between the DC circuit and the output.

16. A method for bypassing a power stage of a multilevel inverter circuit, the method comprising:
    electrically disconnecting all switching devices of a switching circuit of the power stage from an output of the power stage, wherein electrically disconnecting the switching circuit from the outpost comprises opening a pair of output control switches; and
    electrically connecting two output terminals of the power stage to one another to bypass the power stage, wherein electrically connecting the two output terminals to one another comprises closing a bypass switch.

17. The method of claim 16, comprising opening the pair of output control switches before closing the bypass switch.

18. The method of claim 16, comprising electrically disconnecting the switching circuit from an input of the power stage.

19. The method of claim 16, wherein the pair of output control switches includes a first output control switch coupled between a first node of the switching circuit and a first output terminal, and a second output control switch coupled between a second node of the switching circuit and a second output terminal; and wherein electrically disconnecting all the switching devices of the switching circuit of the power stage from the output of the power stage comprises:
    opening the first output control switch; and
    opening the second output control switch.

20. The method of claim 16, wherein the output control switches are semiconductor-based switches, contractors or relays.

* * * * *